Jan. 21, 1958

R. R. HARR 2,820,574

INTERLOCK FOR PUMP CONTROL AND REGISTER OF A
LIQUID DISPENSING APPARATUS

Filed Nov. 23, 1956

INVENTOR
*Robert R. Harr*
BY *T. Wallace Quinn*

ATTORNEY

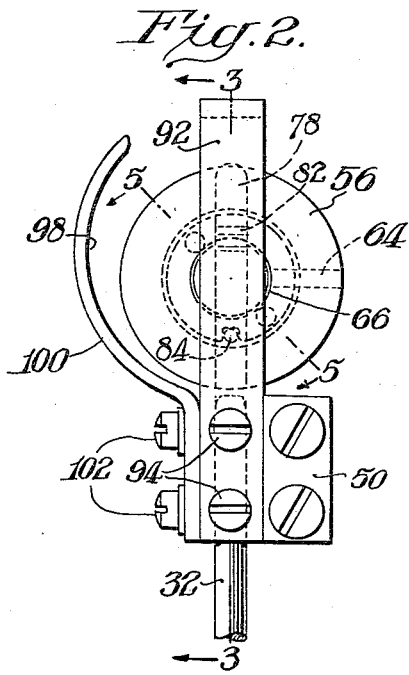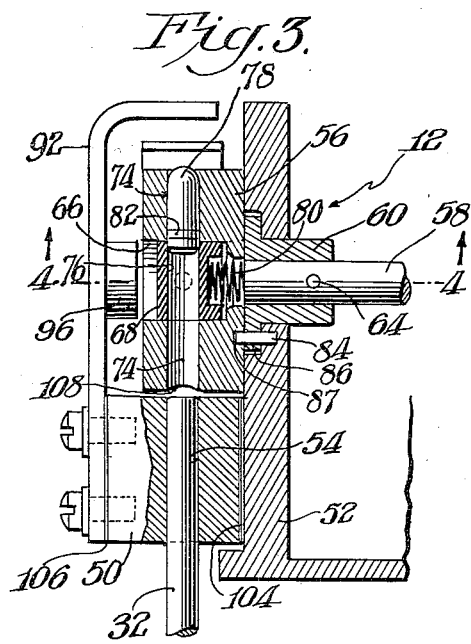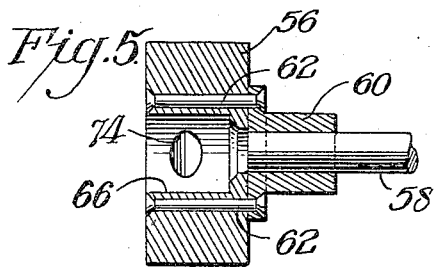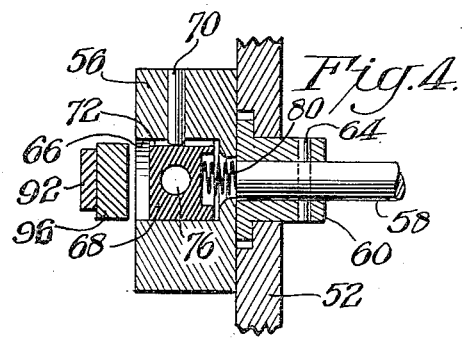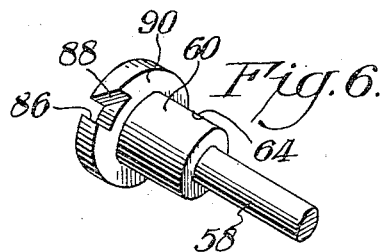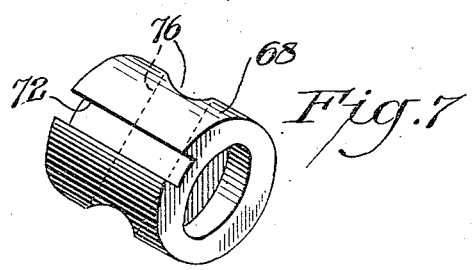
INVENTOR.
Robert R. Harr
BY T. Wallace Quinn
ATTORNEY

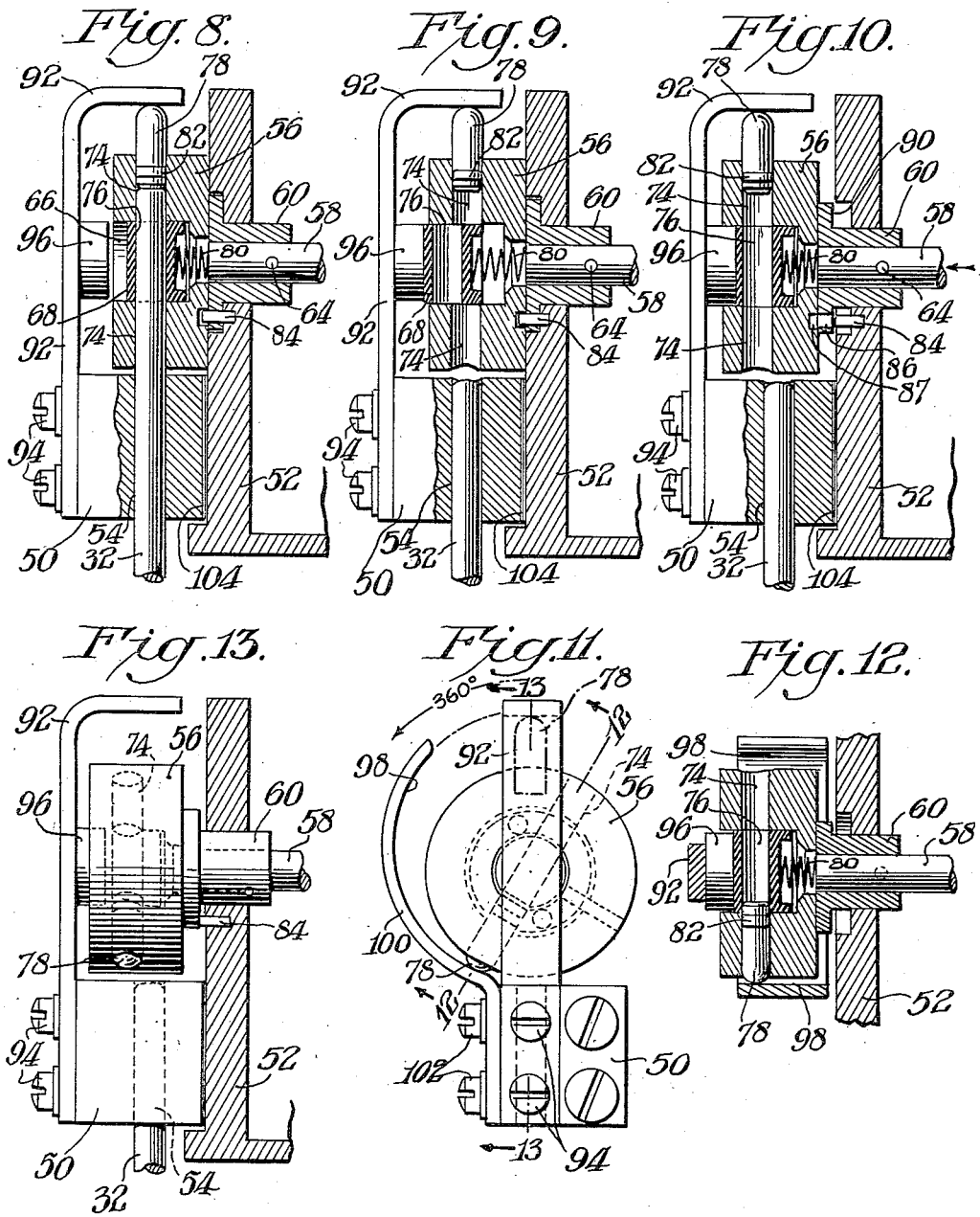

United States Patent Office 2,820,574
Patented Jan. 21, 1958

2,820,574

INTERLOCK FOR PUMP CONTROL AND REGISTER OF A LIQUID DISPENSING APPARATUS

Robert Russell Harr, Fruitland, Md., assignor to The Wayne Pump Company, Salisbury, Md., a corporation of Maryland Application November 23, 1956, Serial No. 623,984

10 Claims. (Cl. 222—34)

This invention relates to a device for interlocking the pump control and indicating register of a liquid dispensing apparatus, for example a gasoline dispensing pump, to prevent simultaneous resetting and dispensing and to compel resetting after each dispensing operation. It more particularly relates to an interlock which may be operatively associated with a register including a shaft axially movable to a resetting position where it is rotated to effect resetting.

An industrial-type gasoline pump is a non-computing pump originally intended for fueling trucks, fleet cars and material handling equipment operated by a particular company. A straight-reading register, for example of the Veeder-Root type, reading directly in gallons is, for example, conventionally associated with such pumps to provide an indication of the amount of gasoline dispensed. A ticket printer may be connected to this register if a record of each delivery is desired. The Veeder-Root register is a standard article of commerce and is described in detail in Patent 2,610,794. It has a shaft which is axially shifted from an indicating position to a resetting position where it is rotated through one complete revolution to effect resetting.

Recently, users of these industrial pumps have been using them with ticket printers to sell gasoline to trucks because of the desirability of printed receipts. Weights and measures rules, however, require that registers be interlocked with the pump controls when a dispensing pump is used for the sale of gasoline.

An object of this invention is to provide a simple device for interlocking the pump control and register of an industrial-type pump which prevents simultaneous dispensing and resetting and which compels resetting after each dispensing operation.

A more specific object is to provide a device of the aforementioned type for interlocking a register including a shaft, which is axially movable from an indicating position to a resetting position where it is rotated 360° to effect resetting, with a mechanically actuated pump switch.

In accordance with this invention, a block is secured to the register shaft. An insert is mounted within a recess within this block to move axially relative thereto. Corresponding holes are provided in the block and insert. Resilient means react within this recess between the insert and block in a direction to move the insert relative to the block to misalign these corresponding holes.

A holding pin is commonly insertable within these corresponding holes to maintain them in alignment. A reciprocating plunger is connected to the mechanical means for actuating the pump switch. This plunger is mounted adjacent the periphery of the interlock block and extends through the corresponding holes when they are aligned by the holding pin to lock the shaft in its registering position. In passing through these corresponding holes, the plunger travels a distance sufficient to allow the pump to be started and drives the holding pin out of the insert whereupon it protrudes out of the block. When the pump is stopped, the plunger is withdrawn which allows the insert and its hole to move axially out of alignment with the block. This prevents the plunger from passing through the block and insert which prevents the pump from being started.

An abutment is provided in the path of axial movement of the insert to arrest its movement to permit the corresponding holes in the block and insert to be aligned when the register shaft and block are moved axially to the resetting poistion. A cam surface is positioned adjacent the periphery of the block where it is contacted by the protruding holding pin when the block is rotated during resetting to drive the pin back into the insert to lock the insert and block together. This maintains these corresponding holes in alignment when the shaft and block move axially back to the indicating position so that the plunger can once more pass through them to start the pump and lock the shaft.

Novel features and advantages of the present invention will become apparent to one skilled in the art from a reading of the following description in conjunction with the accompanying drawings in which similar reference characters refer to similar parts and in which:

Fig. 2 is a view in elevation of the portion of the embodiment included within the box attached to the side of the register shown in Fig. 1;

Fig. 3 is a cross-sectional view taken through Fig. 2 along the line 3—3 and looking in the direction of the arrows;

Fig. 4 is a cross-sectional view taken through Fig. 3 along the line 4—4 and looking in the direction of the arrows;

Fig. 5 is a cross-sectional view taken through Fig. 2 along the line 5—5 and looking in the direction of the arrows;

Fig. 6 is a perspective view of a portion of the embodiment shown in Fig. 3;

Fig. 7 is a perspective view of another portion of the embodiment shown in Fig. 3;

Fig. 8 is a cross-sectional view in elevation similar to Fig. 3 in the condition that exists when the pump is dispensing;

Fig. 9 is a cross-sectional view in elevation showing the condition that exists when the pump has been shut off;

Fig. 10 is a cross-sectional view in elevation similar to Fig. 3 showing the conditions that exist when the register shaft is shifted axially for resetting;

Fig. 11 is an end view in elevation showing the relative positions of the holding pin and cam surface as the register shaft is rotated to effect resetting;

Fig. 12 is a cross-sectional view taken through Fig. 11 along the line 12—12 and looking in the direction of the arrows; and Fig. 13 is a cross-sectional view in elevation taken through Fig. 11 along the line 13—13 and looking in the direction of the arrows.

Figure 1:
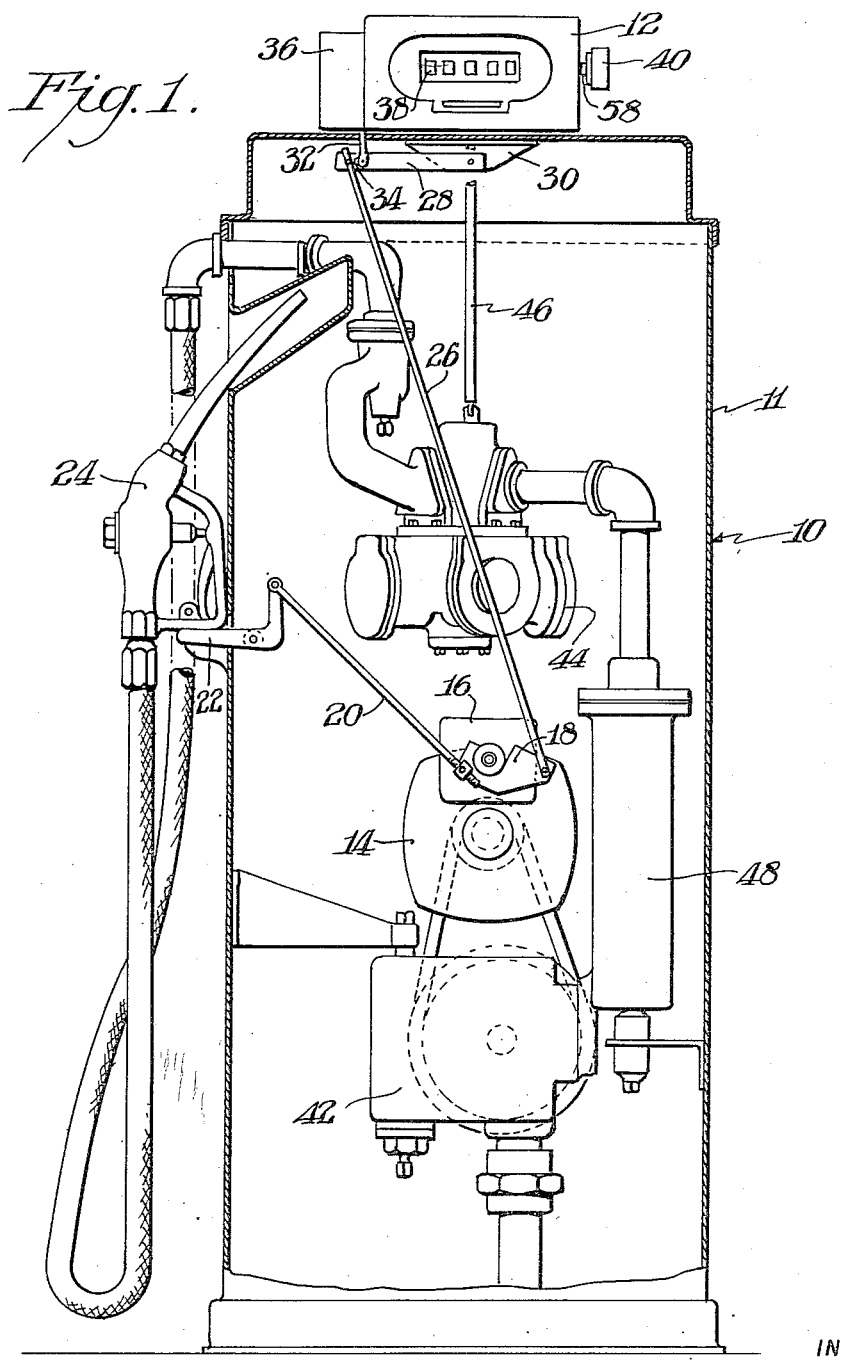
Fig. 1 is a view in elevation partly in cross section of an industrial-type pump upon which an embodiment of this invention has been attached.

Referring to Fig. 1, an industrial-type pump 10 is shown including a Veeder-Root register 12 of the type described in Patent 2,610,794, for example. Pump 10 includes an electric motor 14 which is controlled by a switch 16. A mechanically-actuated means or plate 18 is coupled to switch 16 for operating the switch to turn motor 14 on and off. Connecting rod 20 connects lever 22 to plate 18 to permit the switch 16 to be turned on by lifting the external end of lever 22 when the dispensing nozzle 24 is lifted from it. A rod 26 connects plate 18 to a lever 28 which is pivoted to a bracket 30 secured within the casing 11 below register 12. A plunger 32 is secured to an enlarged hole 34 on lever 28 so that it is reciprocated upward and downward upon rotation of plate 18. Plunger 32 extends within case 36 mounted upon the side of register 12 and includes portions of the interlock mechanism which are later described in detail.

Register 12 also includes a face 38 which displays dials which indicate the gallons of gasoline, for example, discharged in a dispensing operation. A reset knob 40 is included on the side of the register opposite from case 36. This knob is moved axially toward the register and then rotated through a 360° revolution in order to reset the register. The device installed within case 36 prevents knob 40 from being rotated or moved axially towards the register when the pump is dispensing, and it also prevents the pump from being started while the knob is moved axially inward to its resetting position. The interlock also compels resetting of the indicator after each dispensing operation in order to restart the pump. Other elements incorporated in pump 10 are generally illustrated to indicate an example of a typical pump of this type. These elements include a pump 42, a meter 44 which drives the indicating portion of register 12 through a drive shaft 46 and an air separator 48.

Parts of the interlock included within case 36 are shown in detail in Figs. 2–13 in various illustrative phases of operation. Referring to Figs. 2 and 3, the device incorporated in case 36 is shown in a condition immediately prior to starting of the switch motor by an upward movement of the external end of lever 22.

The upper end of plunger 32 is guided in its upward and downward reciprocating motion by a bearing 50 secured to the frame 52 of register 12. Bearing 50 includes a vertical hole 54 through which plunger 32 moves upward and downward adjacent the periphery of an interlock block 56 secured to register shaft 58. Referring to Fig. 5, block 56, a cylindrical element for example, is secured to bushing 60 by means of a pair of longitudinal rivets 62 having countersunk heads. Bushing 60 is a standard part of register 12 and is fastened to register shaft 58 by means of a pin 64. Rivets 62 accordingly provide a convenient means of attaching the interlock mechanism to the register.

Interlock block 56 includes an axial recess 66, centrally bored for example. An insert 68 is mounted within this recess so that it is free to move axially to and fro. Insert 68, however, is restrained angularly with respect to block 56 by means of a roll pin 70 mounted in block 56 and extending within a keyway 72 in the side of insert 68 (see Fig. 4).

Block 56 and insert 68 respectively include corresponding holes 74 and 76 which are of identical configuration, ¼ inch diameter for example, to permit plunger 32 to traverse them when proper conditions for starting the pump exist. A holding pin 78 is commonly inserted within corresponding holes 74 and 76 to maintain them in alignment to permit traversal by plunger 32. Resilient means 80, a coil spring for example, reacts within recess 66 between the end of insert 68 and block 56, the attached end of shaft 58 for example, in a direction to misalign holes 74 and 76. In Fig. 3, however, holding pin 78 opposes the action of spring 80 and maintains holes 76 and 74 in alignment in preparation for insertion of plunger 32.

A retarding means 82, rubber O-rings for example, are installed about the circumference of holding pin 78 to bear against the walls of holes 74 and 76 to retain the pin in a given position. When sufficient force is applied against the end of the pin, however, the retarding effect of the O-rings is overcome.

A projection 84, a pin for example, is mounted in register frame 52 and extends through an aperture 86 in the shoulder of bushing 60 (Fig. 6). Aperture 86 is continued by means of a hole 87 extending a short distance into the side of interlock block 56. One of the sides of aperture 86 is inclined, as shown at 88, in order to provide a lead surface for guiding the contact of the end of projection 84 to the inside face 90 of the shoulder of bushing 60 for a purpose later described in detail.

In Fig. 7, insert 68 is shown to illustrate its functional parts including keyway 72 and hole 76 which corresponds to hole 74 in block 56.

In Fig. 8, plunger 32 is shown when it is inserted through corresponding holes 74 and 76 when the pump motor is started by an upward movement of the external end of lever 22. Holes 74 and 76 are aligned which permits plunger 32 to travel upward a distance sufficient to permit rotation of plate 18 through an angle sufficient to operate switch 16. As the pump is started, plunger 32 also drives holding pin 78 out of hole 76 and insert 68 whereupon pin 78 protrudes a distance out of block 56. Pin 78 is prevented from being completely driven out of block 56 by the retarding effect of rings 82 and the positive stop provided by the upper hook of bent arm 92 whose vertical leg is pinned to bearing 50 by means of cap screws 94.

In Fig. 9, pump switch 16 has been turned off by a downward movement of the external end of lever 32, for example by replacement of nozzle 24 upon it. Plunger 32 is, accordingly, moved downward and withdrawn from holes 74 and 76 which allows insert 68 to move axially away from register shaft 58 and attached block 56 which misaligns holes 76 from corresponding hole 74. Were an attempt made at this time to start pump motor 14, it could not succeed because the upper end of plunger 32 would be arrested on the side of insert 68 after it has traveled a distance insufficient to operate switch 16. The outward movement of insert 68 is arrested by an abutment 96 mounted, for example, on the vertical leg of hooked arm 92.

In Fig. 10, the operation of resetting register 12 has been commenced which starts to condition the interlock mechanism so that it once more may permit insertion of plunger 32 and one operation of pump switch 16. Register shaft 58 including attached block 56 are moved outward in the direction of the arrow when the operator grasps reset nozzle 40 and moves it axially towards the register 12, as done in resetting. Hole 74 of block 56 is accordingly brought into alignment with corresponding hole 76 of insert 68 which has been arrested in a predetermined position by abutment 96. When shaft 58 is rotated, the end of projecting pin 84 bears against the inside face 90 of the shoulder of bushing 60 to maintain block 56 and hole 74 respectively in alignment with insert 68 and corresponding hole 76 during rotation of the register shaft 58 and attached block 56 through the angle of rotation required to reset register 12, 360° for example. Pin 84 is guided out of apertures 86 and 87 by inclined face 88 of aperture 86 whereupon it bears against face 90 until aperture 86 rotates 360°. Then pin 84 once more falls into aperture 86 to allow bushing 60 and attached block 56 to once more contact register frame 52.

Fig. 13 illustrates the relative positions of pin 84 and bushing face 90 during rotation of shaft 58 and housing 56 as the register is being reset.

In order to permit insertion of plunger 32 when register shaft 58 and block 56 move back to the indicating position, holding pin 78 must be reinserted commonly through apertures 74 and 76. This is accomplished by means of a cam surface 98 provided by the inner surface of an arcuate arm 100 which lies adjacent the periphery of interlock block 56. Arcuate arm 100 is secured to bearing 50 by means of cap screws 102 for example. In Fig. 11, the position of holding pin 78 immediately prior to rotation of shaft 58 is shown in broken line as it is arrested against the upper hooked end of arm 92. After shaft 58 has been rotated approximately 45° for example, the outward protruding end of holding pin 78 contacts cam surface 98 which gradually approaches the periphery of block 56 to drive pin 78 within block 56 and a short distance into insert 68. After approximately 180° of rotation, when the pin is adjacent bearing 50, it has been driven within hole 76 a distance sufficient to maintain block 56 and insert 86 with corresponding holes 74 and 76 in alignment (Fig. 12). When the full amount of rotation necessary to reset register 12, 360° for example, has been achieved, pin 84 drops into recess 86 which permits the register shaft 58 and interlock block 56 to move axially back to the indicating position. This once more restores the parts to the condition shown in Fig. 3 where insertion of plunger 32 is permitted to start another cycle of operation of pump motor 14.

Various means are provided for adjusting the relative positions of the parts to maintain proper alignment during all phases of the operation. Referring to Fig. 3, shims 104 are provided, for example between bearing 50 and register frame 52, to adjust the relative position of bearing 50 and interlock block 56. Shims 106 may also be provided between arm 92 and bearing 50 to adjust the position of abutment 96 which governs the outward position of insert 68 where hole 76 is held in position for reinsertion of holding pin 78 during rotation of register shaft 58.

The lower end of hole 74 is slightly countersunk at 108 to permit the rounded end of plunger 32 to enter hole 74 and lead the parts together even under conditions of slight angular misalignment.

*Operation*

The interlock mechanism previously described in detail, accordingly permits pump switch 16 to be turned on only after register 12 has been reset. This provides the condition shown in Fig. 3 where plunger 32 can enter aligned corresponding holes 74 and 76 in block 56 and insert 68. Switch 16 is turned on only after the end of plunger 32 has passed through hole 76 and driven holding pin 78 out of insert 68 whereupon it protrudes a short distance out of block 56. The pump, therefore, cannot be started unless the register has been reset and upon starting, conditions the interlock mechanism to prevent a subsequent operation of the pump switch without resetting the register.

Fig. 8, accordingly, shows the position of the parts when the pump switch has been turned on. Plunger 32 is shown inserted through block 56 and insert 68. Shaft 58, accordingly, is locked both axially and angularly which effectively locks it in the indicating position. This effectively prevents tampering with register 12 when the pump is dispensing.

In Fig. 9, the parts are shown when the pump has been turned off. Plunger 32 is withdrawn from block 56 and insert 68, which allows insert 68 to move outwardly against abutment 96 to misalign hole 76 from corresponding hole 74. If an attempt is made at this time to restart the pump, the upper end of plunger 32 strikes the periphery of insert 68. This prevents plate 18 from being rotated a sufficient distance to turn switch 16 on. It is, therefore, impossible to restart the pump when the parts are in the condition shown in Fig. 9. However, since plunger 32 is withdrawn from block 56, shaft 58 and block 56 are free to permit axial and angular movement which is required for resetting the register.

Referring to Fig. 10, the parts are shown in the condition which exists when the operator has grasped knob 40 and moved it axially toward register 12 in preparation for resetting. Block 56 is accordingly moved towards arrested insert 68 so that hole 74 is aligned with corresponding hole 76 to permit reinsertion of holding pin 78 into a hole 76. The end of projecting pin 84 is shown free of aperture 86 in bushing 60 with its outer end in position to bear against the inner face 90 of bushing 60. Upon rotation of shaft 58, holding pin 78 is driven back into block 56 and a short distance into hole 76 of insert 68 by cam surface 98 of arcuate arm 100. Insertion of the holding pin 78 is accomplished, for example, from 45° of rotation up to 180° of rotation, for example. When the full resetting rotation has been accomplished, a resilient means incorporated in the register 12 (not shown) snaps shaft 58 and block 56 axially towards register 12 into the indicating position. This arranges the parts once more in the condition shown in Fig. 3 so that the pump may once more be turned on.

During this entire resetting operation, both block 56 and insert 68 are displaced out of alignment with plunger 32 which effectively prevents the pump from being started while the register is being reset. This novel mechanism, accordingly, prevents the pump from being started during the resetting operation. The register and interlock are mutually locked in the indicating position while the pump is dispensing, and after the pump has been shut off, it can not be restarted without shifting the register shaft axially and rotating it to complete the resetting operation.

What is claimed is:

1. An interlock for a liquid dispensing apparatus including a mechanical means for actuating a pump switch and an indicating register including a shaft which is movable from its registering position in an axial direction to a resetting position where it is rotated to effect resetting, said interlock comprising a block secured to said shaft, an insert mounted to move within a recess in said block in said axial direction, said block and said insert including corresponding holes, resilient means reacting within said recess between said insert and said block in a direction to axially misalign said holes, a holding pin commonly insertable within said corresponding holes when said holes are axially aligned, a reciprocating plunger connected to said mechanical means for actuating said switch, said plunger being mounted adjacent said block to extend through said corresponding holes to lock said shaft in its registering position and to permit said plunger and mechanical means to move a distance sufficient to allow said pump to be started, said plunger driving said holding pin out of said insert when said pump is started whereupon said holding pin protrudes out of said block, an abutment which arrests said axial movement of said insert to align said corresponding holes when said shaft and block are moved axially to said resetting position, and a cam surface disposed adjacent said block to be contacted by said holding pin when said shaft is rotated during resetting to drive said pin into said insert to lock said insert and said block together.

2. An interlock as set forth in claim 1 wherein key and slot means connects said block and said insert to prevent angular movement therebetween and to allow said axial relative movement.

3. An interlock as set forth in claim 1 wherein said resilient means is comprised of a coil spring inserted within said recess between said block and said insert.

4. An interlock as set forth in claim 1 wherein a retarding means is associated with said holding pin to bear against the walls of said corresponding holes to retain said pin in position.

5. An interlock as set forth in claim 4 wherein said retarding means is comprised of a rubber O-ring secured about said holding pin.

6. An interlock as set forth in claim 1 wherein an arm is attached to the frame of said register, said arm including said abutment and said arm extending into the path of travel of said holding pin to prevent said holding pin from being driven completely out of said block by said plunger.

7. An interlock as set forth in claim 6 wherein a bearing for guiding said plunger is disposed adjacent said block, and said arm and said cam surface are secured upon said bearing.

8. An interlock as set forth in claim 1 wherein a cooperating projection and aperture means are provided in the mating surfaces of said block and said register frame which engage to permit said corresponding hole in said block to be aligned with said plunger when said shaft is in its indicating position, and said projection bears against the surface including said aperture to maintain said corresponding hole in said block in alignment with said corresponding hole in said insert when said insert is forced against said abutment by said resilient means and said shaft is moved axially to its resetting position and rotated.

9. An interlock as set forth in claim 8 wherein said projection is comprised of a pin extending from the frame of said register, and said aperture is comprised of a slot in said block which has an inclined wall to provide a lead surface for guiding the contact of said projection from said recess to the adjacent wall of said block.

10. An interlock as set forth in claim 1 wherein said block is comprised of a cylindrical element, said recess extending completely through the axis of said block, a shouldered bushing secured to said shaft, said bushing being a part of said register, said block being secured to the shoulder of said bushing with the end of said shaft closing one end of said recess, and said resilient means being comprised of a coil spring which reacts between the end of said shaft and said insert.

No references cited.